United States Patent

[11] 3,596,051

[72] Inventor Hirokazu Nomura
 Yokohama, Japan
[21] Appl. No. 21,394
[22] Filed Mar. 20, 1970
[45] Patented July 27, 1971
[73] Assignee Nippon Koran Kabushiki Kaisha
 Tokyo, Japan

[54] METHOD AND APPARATUS FOR FORMING T-WELDS
 7 Claims, 13 Drawing Figs.
[52] U.S. Cl. .................................................. 219/137,
 219/130
[51] Int. Cl. .................................................. B23k 9/00
[50] Field of Search .......................................... 219/137,
 130, 74, 73

[56] References Cited
 UNITED STATES PATENTS
 3,171,944  3/1965  Linnander ................... 219/137
 3,182,179  5/1965  Anderson .................... 219/137

Primary Examiner—J. V. Truhe
Assistant Examiner—Gregory Smith
Attorney—Steinberg & Blake ABSTRACT: A method and apparatus for forming a T-weld between a pair of plates, one of which has an edge engaging a surface of the other to form with the surface a pair of elongated corners. Fillet welds are deposited in these corners to form the T-weld connection, and the fillet welds are deposited with a welding apparatus which includes at least one pair of leading electrodes situated at the weld-receiving corners in alignment with each other and one pair of trailing electrodes also situated in alignment with each other respectively at the weld-receiving corners and following the leading pair of electrodes at a given distance. The leading pair of electrodes are supplied with a welding current which is substantially less than, preferably one-half of, the welding current which is supplied to the trailing electrodes. Three-phase alternating current is preferably used for supplying the electrodes, and the current is supplied through a transformer which has the primary windings thereof connected in delta and the secondary windings connected into a star connection, the neutral junction of which is connected with one of the plates. The primary and secondary coils of at least one of the phases of the transformer are divided into a pair of primary and coacting secondary coils, and it is these secondary coils which are connected to the leading pair of electrodes, respectively.

PATENTED JUL 27 1971 3,596,051

INVENTOR
HIROKAZU NOMURA
BY
Steinberg and Blake
ATTORNEYS

FIG. 3

WELDING CONDITIONS: ANTI-BLOWHOLE PROPERTIES DEPENDENT ON ARC LOCATION

PRECEDING: 250A 40V  
PRECEDING: 600A 36V  } 600 mm/min   US-43  3.2∅  
US-36  4.0∅

EXPERIMENTS

| LOCATION OF ARCS | | REMARKS |
|---|---|---|
| ←  35 35 35 (mm)  | F | F: BLOWHOLE GENERATION CAN BE SEEN |
| ∘ ∘ | B | B: NUMEROUS, MANY SIZES OF BLOWHOLES ARE SEEN |
| ← 70 (mm) | F | F: NUMEROUS BLOWHOLES SEEN |
| 35 (mm) | B | B: NUMEROUS BLOWHOLES SEEN |
| 35 (mm) | F | F: NUMEROUS BLOWHOLES SEEN |
| 70 (mm) | B | B: NUMEROUS BLOWHOLES SEEN |
| ← | F | F: NO BLOWHOLE GENERATION AT 35-50 mm BETWEEN TWO ELECTRODES. |
|  | B | B: NO BLOWHOLE GENERATION AT 35-50 mm BETWEEN TWO ELECTRODES. |

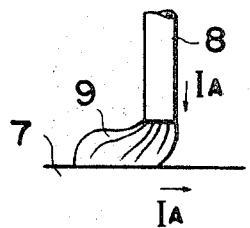
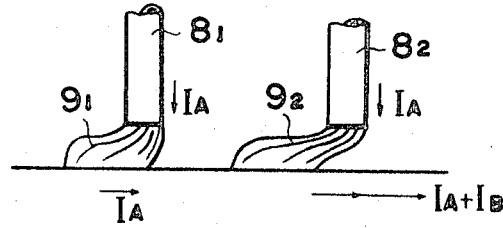

FIG. 4a     FIG. 4b

INVENTOR
HIROKAZU NOMURA
BY
Steinberg and Blake
ATTORNEYS

FIG. 7

ANTI-BLOWHOLE PROPERTY BY THE METHOD OF PRIMARY CONNECTION

| WELDED SIDE / CONNECTING CONDITIONS | F ($13_1$, $14_1$) | | | B ($13_2$, $14_2$) | | |
|---|---|---|---|---|---|---|
| | WELD DEFECTS | OUTER APPEARANCE | SLAG PEEL | WELD DEFECTS | OUTER APPEARANCE | SLAG PEEL |
| (diagram 1) | P P C C | NG NG NG NG | G G G G | P C | NG | G |
| (diagram 2) | N N C N | G G NG G | G G G NG | C C C | G G G G | NG NG NG NG |
| (diagram 3) | C&P C&P C C | G G G G | G G G G | P P P P | G NG NG NG | G G G G |
| (diagram 4) | G G G G | G G G G | G G G G | G G G G | G G G G | G G G G |

NOTE: P : BLOWHOLE GENERATION  N : NO DEFECTS  G : GOOD
C : CUTS SEEN  NG : BAD

INVENTOR
HIROKAZU NOMURA
BY
Steinberg and Blake
ATTORNEYS

METHOD AND APPARATUS FOR FORMING T-WELDS

BACKGROUND OF THE INVENTION

The present invention relates to welding.

In particular, the present invention relates to the formation of T-welds between a pair of mutually perpendicular plates.

As is well known, for many purposes it is required that mutually perpendicular plates be welded to each other to form a T-weld. For this purpose one of the plates has an edge engaging a surface of the other plates and defining with the latter surface a pair of elongated corners which respectively receive fillet welds. Such welding operations may be carried out with two pairs of electrodes.

Conventionally, welding of this type may be carried out automatically according to methods such as submerged arc welding, and open arc welding, all of which are widely used for depositing the horizontal fillet welds in the corners on opposite sides of the edge of the plate which engages the surface of the other plate. However, the plates are conventionally coated with materials such as a washer primer, a zinc-rich epoxy primer or a nonzinc epoxy primer, and coatings of this type have deleterious effects on the welding operations. Also, when reinforcing plates or the like are welded to a baseplate, extending perpendicularly therefrom to form T-welds as referred to above the fillet welding can take place alternately at these plates. With welding as conventionally carried out under these conditions, there is a tendency to form in the welding such defects as blowholes and pipings. Also, the beads of weld themselves are damaged to a substantial degree.

It his been attempted to solve the above problems by removing the coatings of paint or by painting a thin film of paint on the plates. It is believed that the above problems result from the fact that organic materials contained within the coatings become burnt or decomposed forming gaseous bodies which are tripped and remain within the weld metal. The gaseous bodies formed by the decomposition or combustion will disperse out of the weld material when solidification of the molten weld meal takes place at an extremely slow rate, which is to say when the weld metal reaches an equilibrium as determined by the welding conditions and the chemical composition and temperature of the weld metal. Under these conditions, the coatings as referred to above will not be a source of welding defects. This is illustrated by the following example:

EXAMPLE 1

A: Welding materials used
  Submerged arc automatic welding    Flux G 60, Welding wire US-36, 3.2 in diameter, 4.2 in diameter
  Carbon dioxide welding              Welding Wire DWS14 51
  Open Arc Welding                    Welding Wire HS-50A
B: Welding conditions
  Submerged arc automatic welding    640 a., 32 v.
  Carbon dioxide welding              390 a., 35—39 v.
  Open arc welding                    400 a., 30—32 v.
C: Results of the Experiment 1
  System          Wash Primer
  Product         Everbond F
  Film thickness (μ)   18.7

| Welding method | Submerged Arc Automatic Welding | Carbon Dioxide Welding | Open Arc Welding |
|---|---|---|---|
| Welding speed | | | |
| 20cm./min. | | | O O |
| 30 | | O O | O O |
| 40 | O O O O | O O | O O |
| 50 | O O O O | O O | O O |
| 60 | O O O O | | |
| 70 | D X D X | O O | D X |
| 80 | | | |
| 90 | D X D X | D X | |
| 100 | | | |
| 110 | | D X | |

NOTE: O: no defects, D: a few undercuts, X: welding defects

Thus, with the above materials and conditions as shown in the table of Example 1, blowholes are least encountered when the welding speed is 40—50 cm./min. When using carbon dioxide welding or open arc welding with a lesser speed, there also will be not welding defects. In contrast, however, when proceeding to higher welding speeds the increased speed will result in an increase in the number of blowholes. Thus, the above considerations lead to the theory that metal coating arc welding in which the welding speed is extremely slow and TIG welding will generate a lesser number of blowholes, while carbon dioxide shield arc welding and submerged arc welding will generate more blowholes. However, it is not desirable to solve the problem by reducing the welding speed because the output is very greatly reduced and this is particularly undesirable when welding relatively small lengths of plate to each other. It is highly desirable to be able to simultaneously apply fillets in both corners on both sides of the plate at a high speed on steel plates which are coated.

SUMMARY OF THE INVENTION

It is accordingly a primary object of the present invention to provide a method and apparatus which will solve the above problems.

Thus, it is an object of the present invention to provide a method and apparatus which make it possible to simultaneously apply fillet welds into the corners and on the opposite sides of the edge of one plate which engages the surface of another plate, while at the same time avoiding welding defects as referred to above and maintaining the operations at a high speed.

Also, it is an object of the invention to provide a method and apparatus which make it possible to rapidly carry out highly efficient welding operations with a high output and without any detraction in quality so that high quality welds are assured, while using a plurality of pairs of electrodes which may include not only a leading pair and a trailing pair of electrodes but also in same cases, a second pair of trailing electrodes. Thus, the method and apparatus of the invention may be used either with four electrodes or with six electrodes.

According to the invention, the welding current which is supplied to the leading pair of electrodes is substantially less than that which is supplied to the trailing electrodes. Thus, it is preferred to supply to the leading electrodes one-half the welding current which is supplied to the trailing electrodes. To carry out this method of the invention the apparatus of the invention includes a transformer through which three-phase alternating current is supplied to the electrodes. The primary coils of the transformer have a delta connection while the secondary windings have a star connection, the neutral junction of which is electrically connected with one of the plates which is welded. At least one of the phases of the transformer has its primary and secondary windings divided into a pair of primary and secondary coils, and the latter divided pair of secondary coils are respectively connected with the leading electrodes, while the second and third phases have their secondary coils connected to the remaining electrodes.

BRIEF DESCRIPTION OF DRAWINGS

The invention is illustrated by way of example in the accompanying drawings which form part of this application and in which:

FIG. 1b is a schematic elevation of the arrangement of FIG. 1a;

FIG. 3 is a table illustrating the manner in which blowholes are generated in accordance with different electrode positions;

FIG. 4a illustrates the manner in which a welding arc is generated with current flowing through an electrode as illustrated.

FIG. 4b illustrates the manner in which welding arcs are generated when using a pair of electrodes;

FIG. 7 is a table illustrating the results achieved with the electrical connections of the invention and other connections to form a comparison therewith;

FIG. 8b indicates the manner in which the welding current is distributed and the welding carried out according to the embodiment of FIG. 8a.

DESCRIPTION OF PREFERRED EMBODIMENTS

Figure 1A:
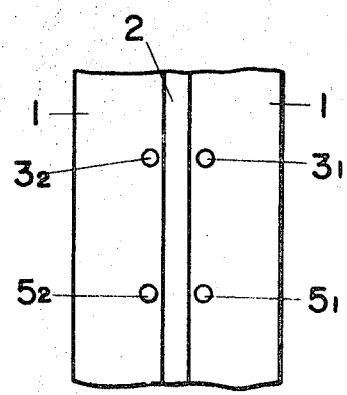
FIG. 1a is a schematic fragmentary top plan view of a conventional welding method using four electrodes.
Figure 1B:
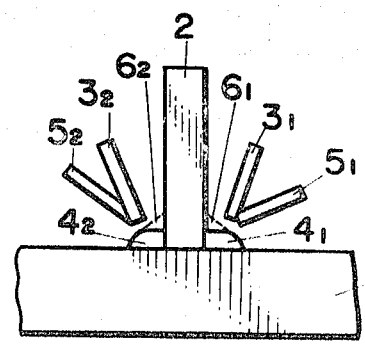

Referring now to FIGS. 1—4 which represent conventional techniques, it will be seen that in FIGS. 1a—2 b, there are plates 1 and 2 which are to be welded to each other so as to have a T-weld connection therebetween. Thus, as is particularly apparent from FIG. 1b, the plate 2 has an edge engaging a surface of the plate 1 to define with the latter surface a pair of elongated corners which are to receive the fillet welds to form the T-weld connection between the plates. The plate 2 may, for example, be a reinforcing plate which extends from the baseplate 1.

In order to deposit the fillet welds simultaneously at both of the corners defined between the plates 1 and 2, the arrangements of FIGS. 1a and 1b provides a pair of leading electrodes $3_1$, $3_2$, which are positioned in alignment with each other at opposite sides of the plate 2 at the corners which are to receive the fillet welds. This leading pair of electrodes $3_1$, $3_2$ will be inclined at angles of 40°—60°with respect to the h horizontal base plate 1 which together with plate 2 may be made of steel, for example. The leading pair of electrodes $3_1$, $3_2$ will result in the formation, from suitable unillustrated welding rod, flux, and the like, of welding beads $4_1$, $4_2$, as shown in FIG. 1b.

The trailing pair of electrodes $5_1$, $5_2$ also will conventionally be situated in alignment with each other on opposite sides of the plate 2 at the corners where the welds are to be deposited. These trailing electrodes $5_1$, $5_2$ will normally have an angle of 45°—50°with respect to the steel plate 1, and the welding current which is supplied to the trailing electrodes $5_1$, $5_2$ will be on the order of 80 percent less than the welding current supplied to the leading electrodes $3_1$, $3_2$, so as to form from the trailing electrodes the beads $6_1$, $6_2$, indicated in phantom lines in FIG. 1b.

With this particular method of simultaneously depositing the fillet welds in the opposed corners on opposite sides of the sheet 2 where the latter intersects the sheet 1, there is an excellent dispersion of the gas which is generated in the cavity which forms each of the corners at the intersection between the plates 1 and 2. However, the four electrodes $3_1$, $3_2$, $5_1$, $5_2$ all approach the welding location at the same time and all simultaneously generate arcs so that the arcs generated by the welding current have complex magnetic influences upon each other, with the result that there is a lack of stability in the arcs. As a result of this lack of stability there is an unavoidable irregularity in the formation of the beads of weld and there is an unavoidable generation of blowholes.

Figure 2A:
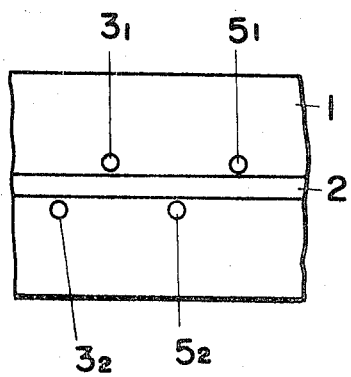
FIG. 2a is a schematic top plan view of another arrangement of a welding method.
Figure 2B:
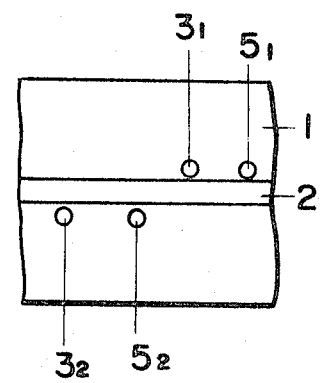
FIG. 2b shows a still further welding method in a schematic top plane view.

In order to attempt to solve this problem, described above in connection with FIGS. 1a and 1b, it has been proposed to vary the position of the electrodes as indicated in FIG. 2a, according to one variation, and in FIG. 2b, according to another variation. Thus, in these figures there are also lower main plates 1 which are to be welded to the vertical reinforcing plates 2, these plates being in the form of steel sheets, for example. The welding current is distributed among the several electrodes in the same manner as described above in connection with FIGS. 1a and 1b. However, in the methods illustrated in FIGS. 2a and 2b where the leading and trailing electrodes are no longer in alignment but instead are offset with respect to each other in the manner illustrated, the dispersion of gas in the corners defined between the plates at their intersection is not satisfactorily carried out. There is an unavoidable trapping of the gas in the weldment with the staggered electrode arrangements illustrated in FIG. 2a, where the electrodes alternate with each other, or in FIG. 2b, where one set of leading and trailing electrodes are completely offset with respect to the other set of leading and trailing electrodes.

The table of FIG. 3 illustrates the number of blowholes which result from different electrode positions. As is apparent from the table of FIG. 3, where in the several illustrated electrode positions two of the electrodes are shown at the front F and two of the electrodes are shown at the back B, it is clear that the best results are achieved with an arrangement as described above in connection with FIGS. 1a and 1b where the leading electrodes are aligned and the trailing electrodes are aligned. In all of the cases of table 3 where there was any lack of alignment of the leading electrodes with each other and the trailing electrodes with each other, there was undesirable generation of many blowholes, so that the alignment of the leading electrodes with each other and the alignment of the trailing electrodes with each other provides a welding of superior quality. It can be assumed that the reason for the blowholes with all other positioning of the electrodes can be attributed to the lack of stability resulting from the interaction of the electromagnetic forces among the several electrodes as well as the interaction between the ground current and the electrodes.

Reference may be made to "A Study on the Movement of Fused Steel in Submerged Arc Welding," circulated on Dec. 7, 1967 by the Committee on Studies of Arc Physics of the Academic Society of Welding, Japan. This paper reports a change in the appearance of the weld beads when the direction of the ground current is changed with respect to the welding direction when using a single electrode. During welding with a plurality of electrodes, as set forth above, there are a plurality of e different ground currents which flow near the electrodes. When using AC current, the total ground current constantly changes, resulting in instability of the arcs of the several electrodes.

Referring now to FIGS. 4a and 4bb, the relationship between the arcs and the electric current in the case where a single electrode is used (FIG. 4a) and where two electrodes are used (FIG. 4b) are illustrated. In FIG. 4a, the steel sheet 7 is subjected to welding with a welding structure which includes the electrode 8 supplied with the welding current $I_A$. From the tip of the electrode 8 there is generated an arc 9 which is generated toward the left, as viewed in FIG. 4a, by the welding current $I_A$, and the ground current flows through the steel sheet 7 in a direction opposite to that of the arc 9, as shown by the lower horizontal arrow designated $I_A$ in FIG. 4a.

Referring to FIG. 4b, it will be seen that where a pair of electrodes are used to apply a weld to the steel sheet, the electrode $8_1$ is provided with a welding current $I_A$ while electrode $8_2$ is provided with a welding current $I_B$. These electrodes are situated at a given space from each other as shown in FIG. 4b. Thus, the welding currents $I_A$ and $I_B$ are fed simultaneously to the electrodes $8_1$ and $8_2$. At the electrodes $8_1$ the current generates an arc $9_1$ which stretches toward the left from the tip of the electrode $8_1$ as a result of the action of the welding current $I_A$, which has a ground current flowing toward the right, as shown in FIG. 4b. Thus, in this case, also, the arc generated in one direction and the ground current flows in an opposite direction. At the second electrode $8_2$, there is a second arc $9_2$ generated by the welding current $I_B$, and this arc $9_2$ also is generated toward the left while the ground current flows toward the right, so that there is a combined ground current $I_A$ and $I_B$ from the currents fed to both of the electrodes, and it is this combined current which flows beneath the second electrode $8_2$ in a direction opposite to that in which the arc is generated.

Thus, in the case of the single electrode of FIG. 4a, the arc 9 is generated toward the left as a result of the influence of the electromagnetic action resulting from the current flowing in the electrode and the ground current. In the case where two electrodes $8_1$, $8_2$ are used as illustrated in FIG. 4b, and arc $9_1$ is generated in a manner similar to the arc of FIG. 4a. However, the arc $9_2$ is generated in a direction further inclined toward the left, as compared with arc $9_1$, as a result of the interaction of the electromagnetic power of the currents $I_A+I_B$ flowing in the ground wire and as a result of only the current $I_B$ flowing through the electrode $8_2$. Where the distance between the electrodes $8_1$ and $8_2$ is relatively small, then the arcs $9_1$ and $9_2$ of the electrodes $8_1$ and $8_2$ either are attracted toward and drawn to each other (when the direction of $I_A$ and $I_B$ are the same) or they separate apart from each other (when the direction of $I_A$ and $I_B$ are different). Thus, where the electrodes $8_1$ and $8_2$ are relatively close to each other, the interaction of the electromagnetic forces between the electrodes becomes greater. As a result, with the conventional apparatus, there is an instability in the arcs giving rise to faulty bead formation with the generation of blowholes as well as a damage or rupture in the appearance of the beads.

In order to improve the above conditions, the present invention has been developed. According to the present invention a pair of fillet welds are simultaneously deposited along the corners defined between the pair of mutually perpendicular plates which are to be welded to each other, and a plurality of pairs of electrodes are used, this plurality of electrodes including at least one pair of leading electrodes and one pair of trailing electrodes with the leading electrodes in alignment with each other and the trailing electrodes also in alignment with each other, as illustrated in FIGS. 1a and 1b. However, the welding current which is supplied to the electrodes is derived preferably from three-phase AC current with a proper selection of phase differential which will minimize the total of ground current of the several electrodes. In addition with the present invention a high degree of stability of the welding arcs is maintained by providing for the pair of leading electrodes a welding current value which is substantially less than that of the trailing electrodes, preferably approximately one-half of the welding current utilized by the trailing electrodes. In this way experience has shown that it becomes possible to prevent the generation of blowholes and to keep a smooth uninterrupted good appearance for the beads of weld.

Figure 5:
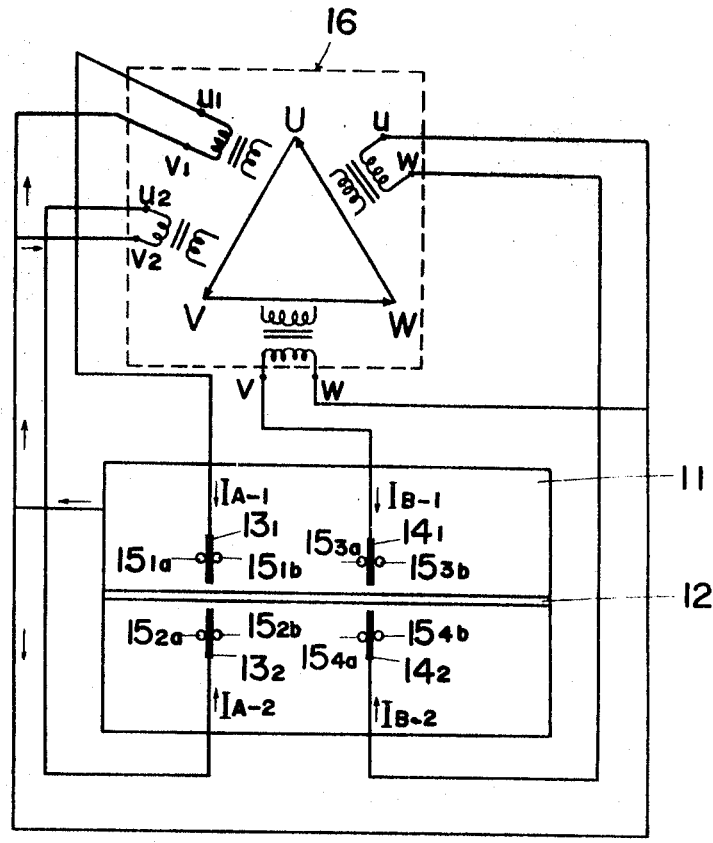
FIG. 5 is a schematic wiring diagram and representation of the welding method and apparatus of the present invention.
Figure 6:
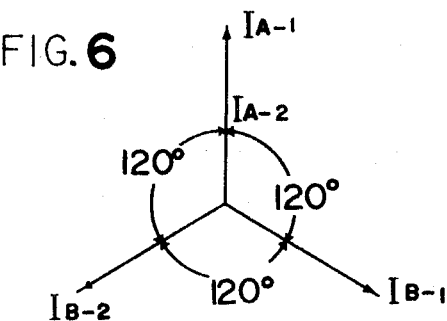
FIG. 6 diagrammatically illustrates the star connection of the secondary windings of the transformer.

One embodiment of the invention is described in connection with FIGS. 5—7. Referring to FIG. 5, there is illustrated a base sheet or plate 11 of steel, for example, having in upper face schematically shown in FIG. 5. The reinforcing plate 12, which also may be of steel, his its lower edge engaging the upper face of the plate 11 with these plates being mutually perpendicular so as to form a T-wled by simultaneous deposition of fillet welds along the corners defined between the perpendicular plates 11 and 12. In the illustrated example there is a pair of leading electrodes $13_1$, $13_2$ which are aligned with each other on opposite sides of the sheet 12 at the corners between the latter and the sheet 11. At a suitable distance behind the pair of leading electrodes $13_1$, $13_2$, there is a pair of trailing electrodes $14_1$, $14_2$ which also are aligned with each other on opposite sides of the plate 12 at the corners defined between the latter and the plate 11. In this case, however, the leading electrodes $13_1$, $13_2$ are situated by supporting components $15_{1a}$, $15_{1b}$, for the electrode $13_1$, and $15_{2a}$, $15_{2b}$, for the electrode $13_2$, at an angle of 50–60° with respect to the plate 11. On the other hand, the trailing electrodes are supported by components $15_{3a}$, $15_{3b}$, for the electrode $14_1$, and $15_{4a}$, $15_{4b}$, for the electrode $14_2$, at an angle of 45–50° with respect to the baseplate 11.

The current is supplied to the electrodes by way of a transformer 16 from three-phase alternating current with the three-phase transformer providing a delta connection for the primary windings, as schematically shown in FIG. 5. The secondary transformer windings are connected with the several electrodes in the manner shown in FIG. 5, and while the transformer 16 provides for the primary windings the delta connection shown schematically in FIG. 5, the secondary windings terminate in a star connection schematically represented in FIG. 6, with the neutral junction of the star connection connected electrically with the base plate 11. The primary windings of the transformer are located between the terminals U, V, W. However, it is to be noted that one of the phases of the transformer has its primary and secondary windings divided into a pair of subsidiary primary and secondary windings which coact with each other, providing the several secondary winding terminals $u_1$, $v_1$, $u_2$, $v_2$, corresponding to the primary windings between the terminals U, V. The terminals $v$, $w$, are provided for the secondary winding which coacts with the primary winding between the terminals V, W while the terminals $w$, $u$, are provided for the secondary winding coacting with the primary winding between the terminals W, U. In this way the electric voltage is delivered to the secondary windings. With this arrangement it is clear that the electrical voltage between the terminals $u_1$, $v_1$ and the electrical voltage between the terminals $u_2$, $v_2$ are each one-half the voltage between the terminals $v$, $w$, and $w$, $u$ of the secondary windings of the two phases which are not divided as is the case with the phase U. V. The terminals $u_1$, $u_2$, are respectively connected with the electrodes $13_1$, $13_2$. The terminals $v$, $w$, of the remaining pair of secondary coils are respectively connected with the pair of trailing electrodes $14_1$, $14_2$. All of the remaining terminals are connected in common to the steel plate 11 by way of the neutral junction of the star connection.

As a result of providing for the leading electrodes $13_1$, $13_2$, a welding current on the order of one-half that of the trailing electrodes $14_1$, $14_2$, the coated surface on the metal at the region of the welding bead is burned away by the heat of the arc and by the heat taken from the high temperature of the fused metal at the point where the leading electrodes $13_1$, $13_2$ are located, and in this way most of the organic substances are converted into a gas. The leading or preliminary beads and burned coating surfaces formed by the action of the leading electrodes is again fused and rendered molten by the trailing electrodes $14_1$, $14_2$, as a result of the greater welding current of the latter, and therefore the effective dispersion of the gaseous bodies is assured and the stable arcs will result in good, smooth beads of the highest quality, so that in this way there is a very reliable prevention of the generation of blowholes. Referring now to FIG. 6, the action of the ground current and the attainment of the arc stability is illustrated therein. The welding currents $I_{A11}$, $I_{A12}$, supplied to the electrodes $13_1$, $13_2$, respectively, are taken from the same phase, namely the phase U, V, illustrated in FIG. 5, while the remaining welding currents $I_{B11}$, and $I_{B12}$ of the trailing electrodes are respectively taken from the remaining two phases, as described above and illustrated in FIG. 5. These phases of the trailing electrodes are situated with one leading the phase of the leading electrodes by 120° and the other trailing the phase of the leading electrodes by 120°, so that the currents $I_{B12}$, and $I_{B11}$, are situated with the single phase for the currents $I_{A11}$, and $I_{A12}$, between these two currents which are respectively supplied to the trailing electrodes. Since the current value $I_{A11}$ and the current value $I_{A12}$ are each approximately one-half the current value $I_{B12}$ or $I_{B11}$, respectively supplied to the trailing electrodes, the relative value of the current of the three phases is the same enabling the ground current to closely approximate a zero value.

With respect to the interaction of the ground currents of the several electrodes, the electrical current value $I_{A11}$, $I_{A12}$, are each approximately one-half the electrical current value $I_{B11}$, or $T_{B12}$, so that whatever interaction takes place will be one-half when the leading electrode $13_1$ or $13_2$ and the trailing electrode $14_1$ or $14_2$ are in the same phase. This action will be one-quarter when the trailing electrodes $14_1$, $14_2$ are in the same phase. Results which have been obtained by experiment are illustrated in FIG. 7 to further demonstrate the above factors. Referring to the chart of FIG. 7, the generation of blowholes is illustrated in various different combinations of the phases of the welding currents supplied to the several electrodes. Thus, the first three arrangements of the phases of the welding currents shown in the chart of FIG. 7 illustrate that reliable results cannot always be achieved. However, with the star connection of the present invention, shown at the lower part of FIG. 7, exceedingly good results were uniformly achieved.

The above description has been presented with the case where the fillet welds are simultaneously deposited in both corners by making use of four electrodes, namely one pair of leading electrodes and one pair of trailing electrodes.

Figure 8A:
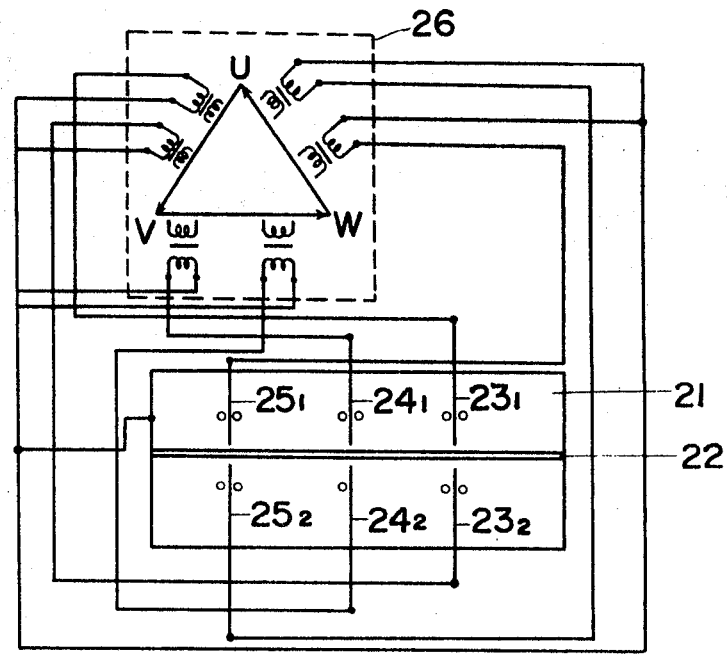
FIG. 8a is a schematic representation and wiring diagram of a further embodiment of a method and apparatus according to the invention.

However, the present invention can also be used with arrangements where in addition to the one pair of leading electrodes there are two pairs of trailing electrodes, one of which is situated between the leading electrodes and the final pair of trailing electrodes, so that a total of six electrodes are used. Such an arrangement is illustrated in FIG. 8a, where there is a schematic representation of a base plate 21, which may be made of steel, which is to have a T-weld connection with the reinforcing plate 22. In this case the pair of fillet welds will be deposited along the corners by a leading pair of electrodes $23_1$, $23_2$, which are in alignment with each other at the opposed corners on opposite sides of the sheet 22. This leading pair of electrodes $23_1$, $23_2$, is followed by a first pair of trailing electrodes $24_1$, $23_2$, which also are in alignment with each other at the opposite corners defined between the mutually perpendicular plates 21 and 22. This first pair of trailing electrodes $24_1$, $24_2$, are in turn followed by a second pair of trailing electrodes $25_1$, $25_2$. This last pair of trailing electrodes are also in alignment with each other on opposite sides of the plate 22 at the corners which simultaneously receive the fillet welds. The several pairs of electrodes are maintained at predetermined adequate distances from each other, as schematically shown in FIG. 8a.

The electrical power is supplied by way of three-phase AC transformer 26 as schematically represented in FIG. 8a. The primary winding of the transformer have a delta connection while the secondary windings have a star connection, the neutral junction of which is grounded to the steel sheet 1, is was the case with the arrangement of FIG. 5. The several terminals of the secondary windings are connected to the several electrodes in the manner shown in FIG. 8a. Thus, the primary winding of the phase UV is divided into a pair of primary windings respectively coacting with secondary windings which have their terminals respectively connected with the leading pair of electrodes $23_1$, $23_2$ in the manner shown in FIG. 8a and corresponding to the arrangement of FIG. 5. However, with the embodiment of FIG. 8a the phase VW is also divided into a pair of primary windings which respectively coact with secondary windings, and the terminals of these secondary windings are respectively connected with the electrodes $24_1$, $24_2$. In the same way the phase UW has its primary winding dividing into a pair of primary coils respectively connected with a pair of secondary coils whose terminals are connected with the second trailing pair of electrodes $25_1$, $25_2$. Thus, the primary winding of the transformer 26 has its various phases connected in delta while the secondary windings have a star connection, as pointed out above.

Figure 8B:
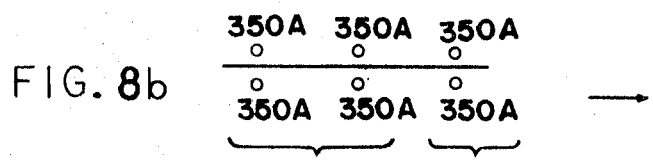

As may be seen from FIG. 8b, the total welding current supplied to all of the trailing electrodes is approximately twice the welding which is supplied to the pair of leading electrodes. FIG. 8b indicates the welding direction as progressing toward the right, while in the illustrated example a welding current of 350 a. is delivered to the leading electrodes. The two pairs of trailing electrodes both receive a welding current the total of which is 700 a., so that in fact the four trailing electrodes each receives a welding current equal to that of each leading electrode, but of course the total welding current of the trailing electrodes is twice that of the leading electrodes so that the results described above in connection with FIGS. 5—7 are also achieved with the arrangements of FIG. 8.

Figure 9:
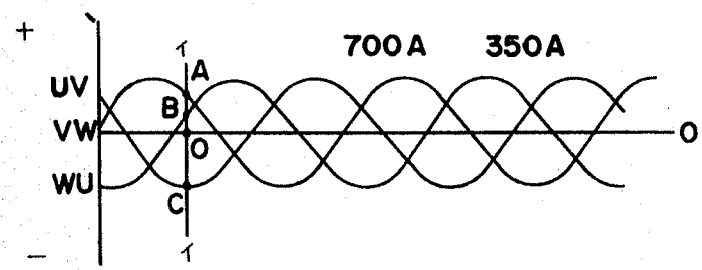
FIG. 9 is a diagrammatic representation of the wave configurations of the individual phases.

The configuration of the waves of the three-phase current which has the phases UV, VW, WU, is illustrated in FIG. 9 where the region above the reference line 0 is positive and the region below this line is negative with the line itself representing a zero current value. Thus, it is clear that the negative current with an electric current voltage of OC length at the UV phase formed by the UV wave will be opposed to the positive current values of the VW phase indicated by OA and that of the VW phase indicated by OB. The negative value OC when added to the positive values OA plus OB results in a zero current value, so that even when using six electrodes with the arrangement of the invention if there is any minor unbalance among the electrical currents of the several phases the total will be sufficiently close to zero if not actually zero.

It is thus apparent that the invention described above can be applied to embodiments in addition to those referred to above without departing from the invention.

As has been pointed out in detail above with the present invention the electrodes of each pair are always arranged in alignment with each other at opposite sides of one of the sheets at the corners which simultaneously receive the fillet welds. The welding current supplied to the leading pair of electrodes may be on the order of one-half the welding current supplied to the trailing electrodes with the various phases of the alternating current distributed at 120° from each other in the case of a three-phase alternating current, so as to minimize the total of the ground currents of the several electrodes as described above. This minimizing of the ground currents also decreases the interaction of the ground currents at each electrode as well as the electromagnetic interaction of the several electrodes with respect to each other. It this becomes possible with the method and apparatus of he invention to solve the problems referred to above by maintaining exceedingly stable arcs without the formation of any blowholes and with an exceedingly smooth and high quality weld bead formed at each of the corners. When these advantages are achieved in connection with the high speed of the operations which can be carried out with the present invention, it is clear that it is possible to achieve with the method and apparatus of the invention a high output of extremely high quality work.

What I claim is:

1. In a method of forming a T-weld between a pair of plates, one of which has an edge engaging a surface of the other to define with the latter surface a pair of elongated corners extending along the edge of said one plate at opposite sides thereof, the steps of simultaneously depositing fillet welds along said corners with four electrodes, two of which form a leading pair of electrodes respectively situated at the corners on opposite sides of said one plate in alignment with each other and the other two of which form a trailing pair of electrodes which follow the leading pair of electrodes during the deposition of the fillet welds and which are also located at the corners on opposite sides of said one plate in alignment with each other, and supplying to the leading pair of electrodes a current which is substantially less than that which is supplied to the trailing pair of electrodes.

2. In a method as recited in claim 1, the step of supplying to the leading pair of electrodes a current which is approximately one-half the welding current supplied to the trailing electrodes.

3. In a method as recited in claim 2 and wherein there are six electrodes, two of which form a second pair of trailing electrodes situated on opposite sides of said one plate at the corners which receive the fillet welds in alignment with each other with the second pair of trailing electrodes located at a given distance behind the first-mentioned pair of trailing electrodes, and supplying to the leading pair of electrodes a welding current which is approximately one-half the total welding current supplied to all four trailing electrodes, and the latter total current being equally distributed among all of the trailing electrodes so that all of the electrodes, both leading and trailing, have approximately equal welding currents supplied thereto.

4. In an apparatus for forming a T-weld between a pair of mutually perpendicular plates, one of which has an edge engaging a surface of the other to form with the latter surface a pair of elongated corners for respectively receiving fillet welds which will form the T-weld connection between the plates, a leading pair of electrodes adapted to be respectively situated at the corners on opposite sides of the edge of said one plate in alignment with each other and a trailing pair of electrodes also situated at the corners on the opposite sides of said one plate in alignment with each other and located at a given distance behind and following the leading pair of electrodes, and a transformer operatively connected with the electrodes and adapted to be connected to the other of the latter plates for establishing a circuit of three-phase alternating current for the electrodes, said transformer having three primary windings connected in delta and three corresponding secondary windings which have a star connection whose neutral terminal is adapted to be connected to said other plate, at least one of the primary windings and the secondary windings which coact therewith being divided into a pair of primary windings of the same phase and a pair of secondary windings of the latter phase coacting with the pair of primary windings, and said latter pair of secondary windings being operatively connected to the pair of leading electrodes so as to supply the latter with a welding current which is approximately one-half that of the trailing electrodes.

5. The combination of claim 4 and wherein the entire primary and secondary coils of a second phase are operatively connected with one of the trailing electrodes while the entire primary and secondary coils of the third phase are electrically connected with the other of the trailing electrodes.

6. The combination of claim 4 and wherein there is an additional pair of trailing electrodes aligned with each other on opposite sides of said one plate respectively at the corners located at a given distance behind the first-mentioned pair of trailing electrodes, and the second- and third-phase windings of the transformer each being divided into a pair of primary and coacting secondary windings, the several coacting primary and secondary windings of the second and third phases of the transformer being respectively connected with the several trailing electrodes.

7. The combination of claim 6 and wherein the pair of coacting primary and secondary windings of the second phase are respectively connected with the first pair of trailing electrodes while the coacting primary and secondary windings of the third phase are respectively connected with the second pair of electrodes.